US008627853B1

(12) United States Patent
Fernando et al.

(10) Patent No.: US 8,627,853 B1
(45) Date of Patent: Jan. 14, 2014

(54) INSULATING MATERIAL FOR AUTOMOTIVE EXHAUST LINE TUBING AND MANIFOLDS

(75) Inventors: Joseph A. Fernando, Amherst, NY (US); Kenneth B. Miller, Lockport, NY (US); Chad E. Garvey, Lewiston, NY (US)

(73) Assignee: Unifrax I LLC, Tonawanda, NY (US)

( * ) Notice: Subject to any disclaimer, the term of this patent is extended or adjusted under 35 U.S.C. 154(b) by 1404 days.

(21) Appl. No.: 11/893,710

(22) Filed: Aug. 17, 2007

(51) Int. Cl.
*F16L 9/14* (2006.01)

(52) U.S. Cl.
USPC .......................... 138/149; 138/141; 138/153

(58) Field of Classification Search
USPC .......................................... 138/149, 141, 153
See application file for complete search history.

(56) References Cited

U.S. PATENT DOCUMENTS

| | | | |
|---|---|---|---|
| 3,661,602 A | 5/1972 | Gerow | |
| 3,891,009 A | 6/1975 | Noda et al. | |
| 3,958,582 A | 5/1976 | Noda et al. | |
| 4,048,352 A * | 9/1977 | Pignocco et al. | 427/234 |
| 4,248,752 A | 2/1981 | Myles | |
| 4,640,312 A * | 2/1987 | Patell et al. | 138/109 |
| 4,664,968 A | 5/1987 | Lord | |
| 5,024,289 A | 6/1991 | Merry | |
| 5,053,362 A | 10/1991 | Chi et al. | |
| 5,703,147 A | 12/1997 | Martin et al. | |
| 5,799,705 A * | 9/1998 | Friedrich et al. | 138/144 |
| 6,417,125 B1 * | 7/2002 | Rorabaugh et al. | 501/95.1 |
| 6,702,062 B2 | 3/2004 | Kusabiraki et al. | |
| 6,725,656 B2 | 4/2004 | Moore, III et al. | |
| 7,858,051 B2 * | 12/2010 | Sako | 422/179 |
| 2003/0145763 A1 | 8/2003 | Grull et al. | |
| 2004/0177609 A1 * | 9/2004 | Moore et al. | 60/323 |
| 2004/0182285 A1 | 9/2004 | Mazany et al. | |
| 2005/0241717 A1 * | 11/2005 | Hallot et al. | 138/149 |
| 2007/0065349 A1 * | 3/2007 | Merry | 422/179 |
| 2007/0163250 A1 * | 7/2007 | Sane et al. | 60/323 |

FOREIGN PATENT DOCUMENTS

| | | |
|---|---|---|
| WO | WO 00/15573 | 3/2000 |
| WO | WO 00/15574 | 3/2000 |
| WO | WO 2006/087441 A1 | 8/2006 |

* cited by examiner

*Primary Examiner* — James Hook
(74) *Attorney, Agent, or Firm* — Curatolo Sidoti Co., LPA; Joseph G. Curatolo; Salvatore A. Sidoti

(57) ABSTRACT

An insulated double-walled pipe including an inner pipe, an outer pipe surrounding the inner pipe to provide a substantially uniform annular gap between the inner and outer pipes, and optionally an annular flange connected to at least one end of the inner and outer pipe, wherein the annular gap is substantially filled with an insulating paste comprising a fiber component, an inorganic binder component, and optionally a vermiculite component, a filler component, and an organic binder component. A method for preparing the insulated double-walled pipe includes providing a double-walled pipe having an annular space between the walls; introducing an insulating paste material into the annular space; freezing the insulating paste material in the pipe; bending the pipe; and thawing and gelling the paste material.

15 Claims, 4 Drawing Sheets

INSULATING MATERIAL FOR AUTOMOTIVE EXHAUST LINE TUBING AND MANIFOLDS

Motor vehicle exhaust lines, and especially exhaust lines containing catalysts, comprise insulated tubes for transporting hot gases from the manifold at the motor output to the catalyst. These kinds of tubes should be well insulated so that the exhaust gases arrive at the catalyst still at a high enough temperature for the catalyst reactions to develop properly (known in the industry as "light off").

There are different types of insulated tubes, double walled tubes, for example, made of concentric tubes, or insulated pipes made of a metal tube, such as a tube made of stainless steel for example, surrounded by an insulating material placed around the metal tube and held in place by an outer structure. The double walled tubes have the drawback of not being easy to bend and heretofore were considered not suitable for complex curved shapes.

Double walled exhaust gas conduits, such as an exhaust gas down pipes and manifolds, are known for preventing heat losses of the exhaust gas. An elbow-type exhaust gas manifold and the following conduit portion extending to a catalytic converter may each comprise a double-walled structure including an external tube and an internal tube. The exhaust gases flow within the internal tube, and the annular space between the external tube on the one hand and the internal tube on the other hand receives no fluid flow and serves as an insulation gap.

The use herein of the term "tube" is intended not to exclude any other suitable conduits for conducting gases nor conduits which comprise more than one tube and which are of a cross-sectional shape other than a circular cross-sectional shape.

Provided is an insulating material that can be used to effectively insulate automotive (car, truck or motorcycle) exhaust tubing such as manifolds and downpipes, and exhaust tubes insulated with such insulating material. One purpose for having an insulating material disposed in an insulating position with respect to an exhaust tube, such as an external coating or lining of an exhaust pipe or in the annular space between the tubes in double-walled exhaust pipes, is to minimize exhaust heat loss prior to exhaust gases entering the catalytic converter. Higher inlet gas temperature results in improved catalytic conversion, which in turn results in a cleaner running vehicle. Another reason for insulating an exhaust system is simply to minimize the risk of injury and fire by containment of the heat generated from exhaust gases.

DESCRIPTION

Figure 1:
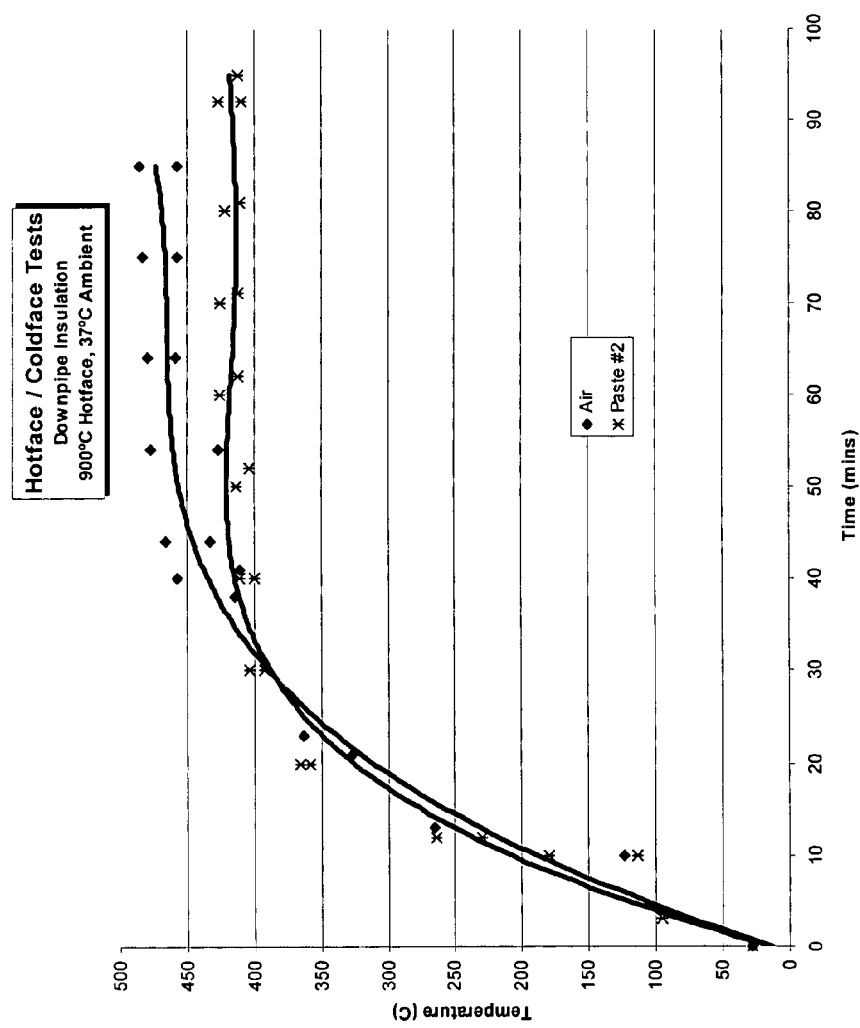
FIG. 1 is a graphical representation of the results of a hotface/coldface test of paste insulation in comparison to an insulating air gap.

Provided is an insulating paste or gel material having appropriate viscosity and flow properties to allow it to be pumped or squeezed into the annular space between an exhaust tube and an outer structure, such as a mould or a second concentric tube, such as the annular space of a double-walled exhaust pipe system.

Also provided is an insulated tube for the exhaust line of a motor vehicle of a type which is composed of a tube for conducting exhaust gases surrounded by an insulating sheath, characterized by the insulating sheath comprising a layer of insulating paste or gel which has been introduced, such as by injection molding or the like, and hardened. The insulated tube may include at least one bend or curve, such as is present in an automotive exhaust downpipe, or the like.

Also provided is a process for manufacturing an insulated tube including an inner tube for conducting exhaust gases, disposed within an outer metallic structure, in which an insulating paste or gel is injected into the space between the tube and the outer structure, which paste or gel is then hardened.

The outer metallic structure may facilitate the injection of the paste or gel around the inner tube, or it may comprise the outer wall of a double-walled automotive exhaust pipe or tube.

In one embodiment, there is provided a manufacturing procedure for an insulated tube, whereby a tube is placed in a mold, i.e. a metal tube for conducting the gas, and an insulating paste or gel is introduced into the mold, optionally by injection molding, which paste or gel is then hardened before stripping the insulated tube.

An illustrative but non-limiting example of a double-walled automotive exhaust pipe or tube includes an inner stainless steel pipe having an outer diameter less than the inside diameter of an outer stainless steel pipe, resulting in an annular gap between them of about 3.5 to about 7.5 mm. The pipes may be welded on one end to a connecting annular flange.

The insulating material is capable of withstanding temperatures up to at least about 900° C., and has a thermal conductivity at 900° C. of less than about 1.7 W/m·K. In addition to the required insulating properties, the insulating material may also have at least some of the following features.

The viscosity of the paste is such that during application of the paste into the annular gap between the inner tube and the outer structure, the viscosity will be low so as to make the application easy and fast. After application, the paste will undergo a gelling process that will harden the paste without exposure to air. This will prevent the paste from dripping out and minimize the need for air exposure for removal of the water.

The paste composition has a fiber component. The fiber may be a high temperature resistant bio-soluble fiber, or a refractory ceramic fiber. Non-limiting examples of high temperature resistant bio-soluble fibers include but are not limited to magnesia-silica fibers, such as ISOFRAX™ fibers from Unifrax I LLC, Niagara Falls, N.Y., or calcia-magnesia-silica fibers, such as INSULFRAX™ fibers from Unifrax I LLC, Niagara Falls, N.Y. or SUPERWOOL™ fibers from Thermal Ceramics Company. Magnesia-silica fibers typically comprise from about 65% to about 86% $SiO_2$, from about 14% to about 35% MgO, and from 0% to about 7% ZrO. More information on magnesia-silica fibers can be found in U.S. Pat. No. 5,874,375, which is hereby incorporated by reference. Calcia-magnesia-silica fibers typically comprise about 15 to about 33% CaO, about 2.5 to about 20% MgO, and about 60 to about 67% $SiO_2$. In certain embodiments, the insulating paste or gel is made of a mix of water and magnesium silicate fibers, for example, and an organic or inorganic binding agent. The tube for conducting the gas may be made of stainless steel. In general, the tube may include at least one bend or curve.

In one embodiment, the tube is surrounded by an insulating sheath comprising an insulating paste such as a mix of water and magnesium silicate fibers, for example, containing 70 to 85% $SiO_2$ and 15 to 30% of MgO, and an organic or inorganic binding agent, which is introduced, such as by injection molding and the like, around the tube in a mold which is removed once the insulating paste has hardened. In another embodiment, the insulating paste is introduced into the annular space between the inner and outer tube of a double walled exhaust pipe, and allowed to harden.

Examples of refractory ceramic fibers include conventional aluminosilicate refractory ceramic fibers, such as Fiberfrax® refractory ceramic fiber available from Unifrax I LLC, Niagara Falls, N.Y., but may also include Fibermax® polycrystalline mullite ceramic fibers available from Unifrax, or other ceramic fibers such as those formed from basalt or industrial smelting slags, mineral wool, alumina, high alumina aluminosilicates, zirconia, zirconia-silicates, titania, chromium oxide, and chrome, zircon and calcium modified alumino-silicates, boron carbide, boron nitride, silica, silicon nitride, silicon carbide, glass, and the like.

The paste composition may optionally have an intumescent component that will expand and play a role in holding the insulating material in place. The intumescent material may include at least one of unexpanded vermiculite, hydrobiotite, water-swelling tetrasilicic fluorine mica, or expandable graphite. The expanded intumescent component may also contribute to the insulating properties of the paste.

The paste composition may also have other components that are used as filling agents or to improve/contribute to the insulating properties of the paste. Examples include but are not limited to inorganic powders or particulates (platelets, whiskers, crushed fibers, and the like) of boron carbide, boron nitride, silica, silicon nitride, or silicon carbide, as well as clays, such as bentonite, hectorite, kaolinite, montmorillonite, palygorskite, saponite, or sepiolite.

The paste may also have organic and inorganic binder materials. The organic binder provides the paste with green strength, providing appropriate rheological properties, e.g., viscosity consistency to the paste to facilitate installation or placement of the paste composition; and maintaining the ceramic fibers in suspension in the liquid vehicle to provide shelf life.

Non-limiting examples of organic binders or resins include, but are not limited to, polyacrylamide, polysodiumacrylate, polyvinyl alcohol, polyethylene oxide, hydroxyethylcellulose, methylhydroxyethylcellulose, hydroxypropylmethylcellulose, carboxymethylcellulose, polyamide, silicone, polyvinylacetate, polyvinylbutyrate, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Solution strength of the binder in water can be determined by conventional methods based on the binder loading desired and the workability of the binder system (viscosity, solids content, etc.).

The inorganic binder component may be derived from finely divided (colloidal) sol of an inorganic high temperature refractory material. A sol is a stable dispersion of discrete colloid size particles in aqueous media. Suitable sols include those of silica, alumina, zirconia and the like and mixtures of these. Suitable sols may interact with appropriately selected organic binders as a thickening agent for the wet paste compositions.

The inorganic binder component may comprise finely divided (colloidal) silica. Colloidal silica acts as a thickening agent, and may be added as a water dispersion of colloidal silica which contains part of the liquid vehicle of the total composition. A suitable colloidal silica is Ludox.® HS-40 colloidal silica, a product of E. I. duPont de Nemours and Company. This product is an aqueous dispersion of 40% amorphous silica. Other dilutions of Ludox® colloidal silica can also be used, the Ludox® HS-40 colloidal silica being diluted with water to give comparable aqueous dispersions having amorphous colloidal silica contents of 30, 20 or 10%, respectively. However, other comparable formulations of colloidal silica may be employed if desired. Other suitable inorganic binder components include colloidal alumina and colloidal zirconia; e.g., zirconia sol-acetate.

Representative examples of suitable paste compositions are set forth in the table below. In certain embodiments, final density of the paste insulation may range from about 0.4 to about 0.8 g/cc. Thermal conductivity of the paste insulation is less than about 1.7 W/m·K, and exemplified paste has been measured at 1.13 W/m·K.

In certain embodiments, the insulating paste may comprise, in weight percent solids, about 30 to about 65% fiber, about 5 to about 20% inorganic powder or particulate filler, about 7.5 to about 33% clay, about 2.5 to about 5% organic binder, about 13 to about 41% intumescent component, and about 1 to about 40% inorganic binder.

Also, in certain embodiments, the insulating paste may comprise, in weight percent solids, about 30 to about 65% fiber, about 5 to about 20% SiC powder or particulate filler, about 7.5 to about 33% bentonite clay, about 2.5 to about 5% methylcellulose binder, about 13 to about 41% vermiculite, and about 1 to about 40% silica sol.

| Example Ingredient | 1 | % solids | 2 | % solids | 3 | % solids | 4 | % solids | 5 | % solids | 6 | % solids | 7 | % solids | 8 | % solids |
|---|---|---|---|---|---|---|---|---|---|---|---|---|---|---|---|---|
| Fiber | 207 | 49.16 | 138 | 31.21 | 138 | 41.79 | 207 | 49.88 | 138 | 58.18 | 200 | 64.10 | 150 | 37.13 | 138 | 41.79 |
| Silicon Carbide | 81.9 | 19.45 | 63 | 14.25 | | 0.00 | 63 | 15.17 | 16 | 6.75 | | 0.00 | | 0.00 | 63 | 19.08 |
| Bentonite Clay | 57.2 | 13.58 | 44 | 9.95 | 107 | 32.40 | 44 | 10.60 | 18 | 7.59 | | 0.00 | | 0.00 | 44 | 13.33 |
| Methyl Cellulose | 11 | 2.61 | 11 | 2.49 | 11 | 3.33 | 11 | 2.65 | 11 | 4.64 | | 0.00 | | 0.00 | 11 | 3.33 |
| Vermiculite | 57.8 | 13.73 | 180 | 40.71 | 68 | 20.59 | 84 | 20.23 | 48 | 20.51 | | 0.00 | 150 | 37.13 | 68 | 20.59 |
| Water | 320 | | 350 | | 410 | | 320 | | 270 | | | | | | 320 | |
| Colloidal silica | 13 | 1.23 | 13 | 1.18 | 13 | 1.57 | 13 | 1.25 | 13 | 2.19 | 280 | 35.90 | 260 | 25.74 | 13 | 1.57 |

| Example Ingredient | 1 | % solids | 2 | % solids | 3 | % solids | 4 | % solids | 5 | % solids | 6 | % solids | 7 | % solids | 8 | % solids |
|---|---|---|---|---|---|---|---|---|---|---|---|---|---|---|---|---|
| Alum + water | 45 | 0.24 | 45 | 0.23 | 45 | 0.30 | 45 | 0.24 | 45 | 0.42 |  | 0.00 |  | 0.00 | 45 | 0.30 |
| Mass Solids | 421.1 | 100.0 | 442.2 | 100.00 | 330.2 | 100.00 | 415.2 | 100.00 | 237.2 | 100.00 | 312 | 100.00 | 404 | 100.00 | 330.2 | 100.00 |

The paste or gel compositions can be introduced into the exhaust tube structure, as a sheath or within the annular space between a double walled tube by conventional hydraulic fill methods, including pumping, squeezing, injection molding, and the like. Because of the paste-like consistency of the insulation material as introduced, it is able to flow into irregular areas, including bends and curves, that would present difficulties for either sheet or solidified molded materials. The insulating paste or gel can thus be easily injected into pre-bent exhaust downpipes and manifolds to fill all available space.

The subject paste or gel compositions are not damaged, nor will they lose their insulating capability by freezing. This paste characteristic will allow the use of the paste in conjunction with the "freeze bending" process for preparing curved double-walled tubing. That is, the paste can be injected into the annular space between double walled tubing, frozen, and then bent, so as to retain the "gap" or separation between the concentric tubes that might otherwise be lost if the concentric tubes were bent with only an air separation during the bending process. The thawed paste can then set or gellify to produce the final insulation material.

The introduced paste or gel composition may gel in about one day. When the insulated tubes are used at temperature in the application as an exhaust tubing, or when subjected to an earlier heat treatment process, the water in the material is removed. When the intumescing temperature of the intumescent component is reached, the intumescent material expands to fill any voids created by the evaporation of the water, and further pressurizes the system as desired and designed by the selection of the compositional ranges of components. Pressurization of the system guards against vibration damage to the insulating material that might otherwise be experienced by loose material between the exhaust tube double walls in operation of the motor vehicle engine.

After exposure to elevated temperatures and vibration conditions, the gelled paste will resist cracking and disintegration because of the network of the expanded intumescent component (such as vermiculite), fiber, binder materials and filler materials.

Thermal testing of representative paste compositions was conducted in a flat plate Instron mechanical testing apparatus. FIG. 1 is a graphical representation of the results of a hotface/coldface test of the paste insulation composition of example 2 in comparison to an insulating air gap. Using the paste insulation, the coldface temperature plateaued at a lower temperature than that experienced by the air gap insulation, which continued to rise throughout the duration of the test.

Figure 2:
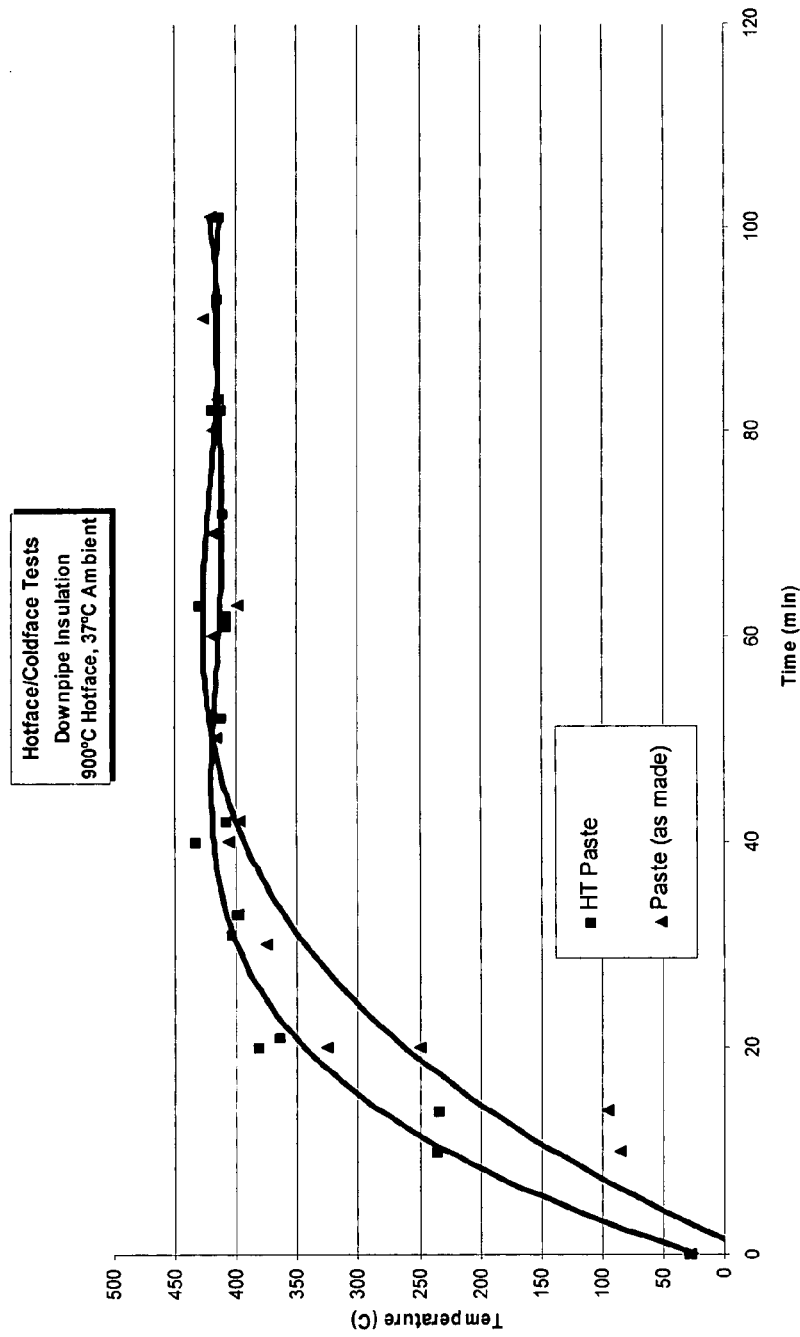
FIG. 2 is a graphical representation of the results of a hotface/coldface test of paste insulation as made in comparison to heat treated paste insulation.

A test was conducted of the paste material as made, compared to the paste material that was heat treated to drive off the water. FIG. 2 is a graphical representation of the results of the hotface/coldface test of paste insulation as made in comparison to heat treated paste insulation, showing that paste as made exhibited a slower initial rise in coldface temperature as it dried, with the temperature plateauing at the same level as the formerly heat treated paste composition.

Figure 3:
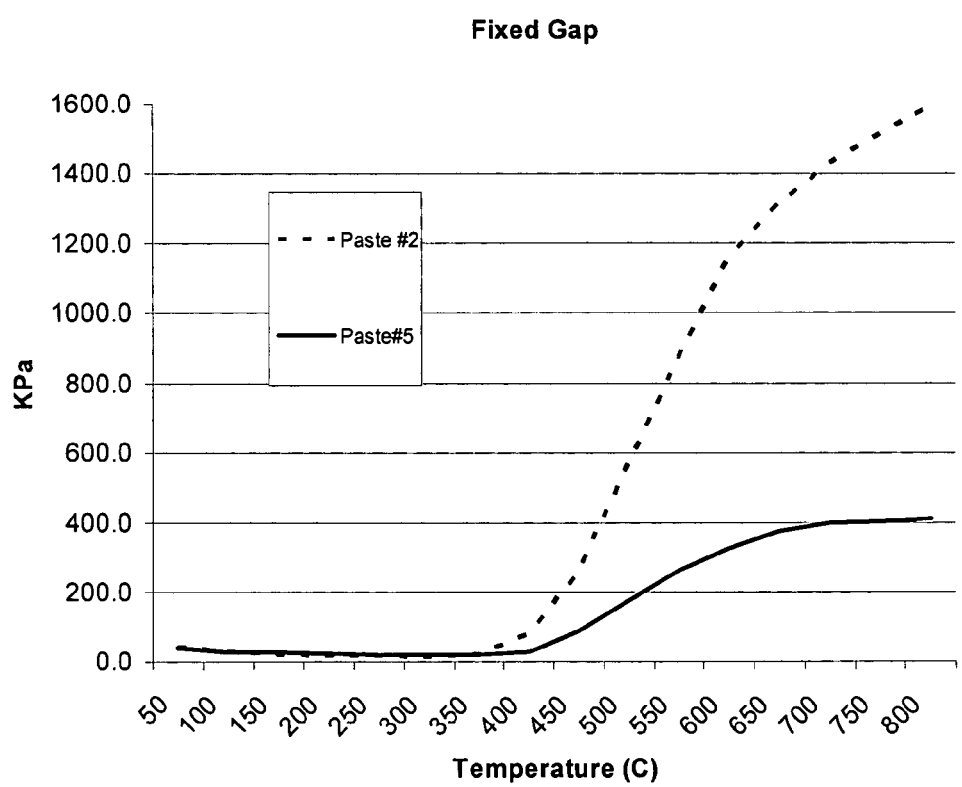
FIG. 3 is a graphical representation of the results of a fixed gap pressure test versus temperature for two insulating paste compositions.

A fixed gap test of two insulating paste compositions was conducted to measure the pressure exerted by the insulation as a function of temperature. FIG. 3 is a graphical representation of the results of a fixed gap pressure test versus temperature for compositions of examples 2 and 5, showing the increased pressure effect of increasing the amount of intumescent material (vermiculite) in the composition. By altering the percentage of intumescent material, a wide range of desired, selected pressures can be achieved.

Figure 4:
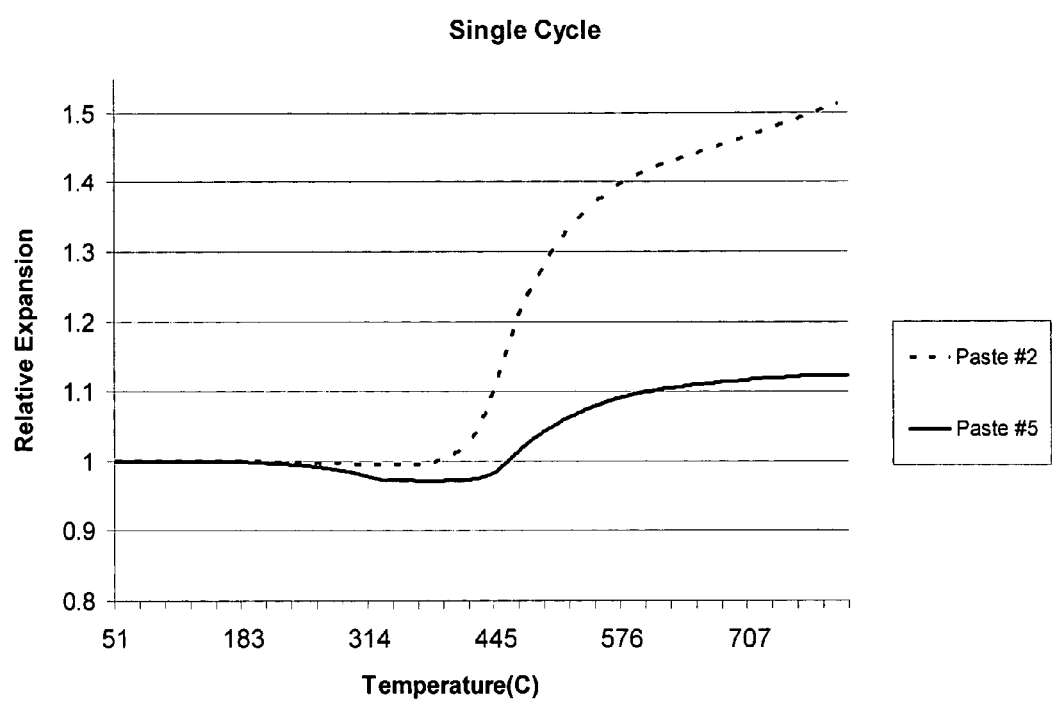
FIG. 4 is a graphical representation of the results of a single cycle test of relative expansion versus temperature for two insulating paste compositions.

A single cycle of a cycled gap test was conducted to simulate thermal expansion and contraction of exhaust pipes, to identify maximum and minimum pressure exerted by the insulation throughout the temperature cycle. FIG. 4 is a graphical representation of the results of a single cycle test of relative expansion versus temperature for insulating paste compositions of examples 2 and 5, showing that the percentage of intumescent material can affect both the negative and positive expansion effects of temperature in the operating cycle.

The heat insulation provided by the insulating paste or gel lowers the temperature of the outer pipe, while maintaining the inner pipe at a higher temperature. Thus, not only is the outer pipe cooler to protect vehicle parts from heat, but a higher gas temperature can be delivered to a catalytic converter for quicker "light off".

The insulating paste or gel materials, and automotive exhaust pipes insulated with these materials, meet the requirements of a low coldface temperature, maximum hotface temperature exposure, vibration damage resistance, and ease of manufacturability, even for curved or bent tubes and irregular spaces, whether the bending is effected before or after introduction of the paste or gel.

In certain embodiments, air can be introduced into the paste, before or during introduction into insulating position relative to the exhaust tubes (such as in the annular space between double walled exhaust pipes or an exhaust manifold), in order to provide additional insulating value to the insulation material.

Although the invention has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

The invention claimed is:

1. An insulated tube for an exhaust line of a motor vehicle of a type which is composed of a metal tube for conducting exhaust gases surrounded by an insulating sheath, disposed within an outer metallic structure, characterized by the insulating sheath consisting of a layer of insulating paste or gel, gellable in the absence of air, which has been injection molded and hardened without firing, within the space between the tube and the outer structure.

2. The insulated tube according to claim 1, characterized by the insulating paste or gel being made of a mix of water, magnesium silicate fibers and an organic or inorganic binding agent.

3. The insulated tube according to claim 1, characterized by the tube including at least one curve.

4. A process for manufacturing the insulated tube according to claim 1, characterized by injecting the insulating paste or gel into the space between the tube and the outer metallic structure, and hardening the paste or gel without firing.

5. An insulating paste material, having a viscosity suitable for introduction into the annular space of a double-walled metallic conduit, said paste material comprising a fiber component, an intumescent component, an inorganic filler component, an organic binder component, and an inorganic binder component; wherein said paste material is gellable in the absence of air; and wherein the gelled paste material resists cracking.

6. An insulated double-walled metallic conduit including an inner metal tube, an outer metal tube surrounding the inner metal tube to provide a substantially uniform annular gap between the inner and outer metal tubes, wherein the annular gap is substantially filled with an insulating paste comprising a fiber component and an inorganic binder component, wherein said insulating paste, gellable in the absence of air, has been injected or pumped and is hardened without firing.

7. The insulated double walled conduit of claim 6, wherein the insulating paste comprises, in weight percent solids, about 30 to about 65% fiber, about 5 to about 20% inorganic powder or particulate filler, about 7.5 to about 33% clay, about 2.5 to about 5% organic binder, about 13 to about 41% intumescent component, and about 1 to about 40% inorganic binder.

8. The insulated double walled conduit of claim 6, wherein the insulating paste comprises, in weight percent solids, about 30 to about 65% fiber, about 5 to about 20% SiC powder or particulate filler, about 7.5 to about 33% bentonite clay, about 2.5 to about 5% methylcellulose binder, about 13 to about 41% vermiculite, and about 1 to about 40% silica sol.

9. The insulated double-walled conduit of claim 6, wherein the fiber component comprises a high temperature resistant bio-soluble fiber.

10. A method for preparing the insulated double-walled conduit of claim 6 comprising:
providing a double-walled conduit having an annular space between the outer wall of the inner tube and the inner wall of the outer tube;
introducing an insulating paste material into the annular space, optionally wherein said insulating paste has been injected or pumped;
freezing the insulating paste material in the conduit;
bending the conduit; and
thawing and gelling the paste material.

11. The method of claim 10 wherein the fiber component comprises a high temperature resistant bio-soluble fiber.

12. The method of claim 10, wherein the insulating paste comprises, in weight percent solids, about 30 to about 65% fiber, about 5 to about 20% inorganic powder or particulate filler, about 7.5 to about 33% clay, about 2.5 to about 5% organic binder, about 13 to about 41% intumescent component, and about 1 to about 40% inorganic binder.

13. The method of claim 10, wherein the insulating paste comprises, in weight percent solids, about 30 to about 65% fiber, about 5 to about 20% SiC powder or particulate filler, about 7.5 to about 33% bentonite clay, about 2.5 to about 5% methylcellulose binder, about 13 to about 41% vermiculite, and about 1 to about 40% silica sol.

14. The insulated double-walled conduit of claim 6, wherein an annular flange is connected to at least one end of the inner and outer tubes.

15. The insulated double-walled conduit of claim 6, wherein the insulating paste further comprises at least one of an intumescent component, an inorganic filler component, and an organic binder component.

* * * * *